United States Patent [19]
Schmidt

[11] 3,940,540
[45] Feb. 24, 1976

[54] NON-SLIP BUILT-UP ROOFING
[75] Inventor: Robert J. Schmidt, El Cerrito, Calif.
[73] Assignee: Chevron Research Company, San Francisco, Calif.
[22] Filed: Jan. 4, 1971
[21] Appl. No.: 103,846

[52] U.S. Cl. .............. 428/332; 156/71; 156/337; 428/280; 428/291; 428/334; 428/335; 428/489
[51] Int. Cl.$^2$... B32B 9/00; B32B 11/00; C09J 3/30; E04B 2/00
[58] Field of Search .......... 161/165, 236, 237, 238, 161/202, 205, 206, 156; 52/309, 516, 518, 622; 156/71, 337, 334; 117/168, 92, 30, 32; 260/28.5 AS; 428/280, 291, 332, 335, 334, 489, 490, 491; 427/407, 412

[56] References Cited
UNITED STATES PATENTS

| | | | |
|---|---|---|---|
| 2,288,293 | 6/1942 | Metcalf | 156/337 X |
| 2,323,336 | 7/1943 | Knorr | 156/337 X |
| 2,326,723 | 8/1943 | Fasold | 161/162 X |
| 2,757,711 | 8/1956 | Petry et al. | 161/236 |
| 2,863,405 | 12/1958 | Leibrook et al. | 52/420 |
| 2,933,469 | 4/1960 | Depew | 161/236 X |
| 2,976,256 | 3/1961 | Whittier et al. | 161/236 X |
| 3,027,342 | 3/1962 | Kempt et al. | 117/135 X |
| 3,094,447 | 6/1963 | Chamberlain | 156/337 X |
| 3,111,787 | 11/1963 | Chamberlain | 156/337 X |
| 3,128,261 | 4/1964 | Lane et al. | 117/127 X |
| 3,407,083 | 10/1968 | Tarbell et al. | 161/236 X |

Primary Examiner—Lorraine T. Kendell
Attorney, Agent, or Firm—G. F. Magdeburger; C. J. Tonkin

[57] ABSTRACT

Built-up roofing employing precoated felts are inhibited from slipping by the use of bituminous emulsions to bind the felts. A minor amount of a compatible latex is incorporated into the emulsion to increase the adhesion of the bonded felts.

14 Claims, No Drawings

NON-SLIP BUILT-UP ROOFING

BACKGROUND OF THE INVENTION

Field of the Invention

Built-up bituminous roofing, commonly known as "tar and gravel" roofing, has been used successfully for many years. This type of roofing has enjoyed widespread use because of several factors: its relatively low cost, ability to prevent the spread of fire compared with wood shingle roofing, long life, and ease of repair. Thus, this type of roofing has been used extensively on both residential and commercial structures.

The construction of built-up roofing has been more or less standardized in the United States for at least the last 40 years. A typical roofing procedure is as follows: Base sheets of lightweight sheathing paper (e.g., 15 lbs./100 sq. ft.) are cemented in overlapping fashion with asphalt or tar to the roof deck, which may be of wood, gypsum, concrete, etc. A cementing layer of molten asphalt or molten tar is then applied by mopping or rolling it evenly over the sheathing paper at a typical rate of about 25 lbs./100 sq. ft. A layer of asphalt- or tar-saturated roofing felt is then placed over the cementing layer, overlapped, and (with steep-pitched roofs), nailed to the roof base. Another coat of cementing bitumen is then applied over the felt, and alternate layers of felt and cementing bitumen are applied in the manner described above until a total of 3 to 5 or more felts are in place. A final heavy layer of bitumen, called a flood coat, is applied over the top layer of felt at a rate of about 60 to 100 lbs./100 sq. ft. A layer of mineral surfacing material is then placed on the flood coat. This material is usually gravel, slag, or crushed stone, and is ordinarily applied at a rate of from about 300 to 500 lbs./100 sq. ft.

A recent development in built-up roofing has been the use of precoated asphalt felts with a consequent modification of the roofing construction. These felts which, in addition to being asphalt-saturated, are coated at the factory on both sides with asphalt which may contain a mineral filler. They are used in roofing systems which employ but two felts, yet are comparable in service life to conventional roofs constructed with 3 to 5 asphalt-saturated felts. The construction techniques employ the same sheathing layer, first cementing coat, flood coat, and mineral surface as used in forming the conventional roofs, but substitute the two precoated felts bonded with one cementing coat for the 3 to 5 saturated felts and their cementing layers.

Many advantages inhere in the use of roofing systems using precoated felts. Probably foremost is the reduction in labor costs resulting from the necessity of applying only two coated layers, rather than the three to five as in ordinary construction techniques. Other advantages which result from use of the coated sheets are enhanced resistance to water and mechanical damage of the sheets during construction and the greatly increased uniformity of the asphalt coating on each sheet, eliminating the possibility of air pocket formation, etc.

While for most applications and in most parts of the world where the precoated felt has been used, its performance has been highly satisfactory, in certain geographic areas, problems of roof slipping have resulted. In these cases, where the roof is pitched, a complete layer of the coated felt (usually the top one), topped with flood coat and gravel, will often separate from the first felt and be displaced a significant distance. This generally necessitates complete roof replacement. The problem has usually arisen in those areas where elevated summer heat caused a sufficient rise in temperature within the roof laminate to reduce the viscosity of the cementing layers of asphalt and allow flow and breakage of the cementing bonds.

My copending application, U.S. Ser. No. 812,315, filed Apr. 1, 1969, teaches one method for reducing the tendency of built-up roofs to slide. In that application, sand particles or the like are placed between the felt layers to inhibit sliding. This subject invention is directed to an alternative method for inhibiting sliding.

From my studies of sliding roofs, the conclusion has been reached that the sliding rate of roofs made with coated felts, when hot mopped asphalt is used as the binder, is proportional to the film thickness of the mopping asphalt. As the thickness of the mopped asphalt is reduced, the sliding rate correspondingly is reduced. And, since the hot mopped asphalt acts primarily as a binder of the felts (it is not needed for waterproofing the roof), the thinner the coat of asphalt which can be formed between the felt layers, the more economical the roof and the less the chances of failure of the roof structure.

Since the application of thin films of hot mopped asphalt is a practical impossibility, the use of another form of binder is necessary. This invention then is directed to the use of asphalt emulsions to bind the roofing felts, since they have the ability to form thin films. However, as will become evident from the specific examples set forth hereafter, only certain types of asphalt emulsions are satisfactory. The initial adhesion and tack of the emulsion bonded systems must be sufficiently high to (1) stay in place without sliding out of position and to (2) stay in place when the wind attempts to get under the sheets and peel them off. Simple bituminous emulsions bind the felt layers by slight softening of the layers being bonded and diffusion of the emulsion residuum into the asphalt coating of the felt layers to form a cohesive unitary mass. This process does not proceed fast enough to give the good initial adhesion strength required. This invention is directed to a method for making bituminous emulsions satisfactory binding agents for built-up roofs.

SUMMARY OF THE INVENTION

Roof coatings and a method of applying them are provided which have a greatly reduced tendency to slip. The roof coatings comprise laminated precoated asphalt felts cemented together with bituminous emulsions, the bituminous emulsions contain, a minor amount of a latex compatible with the bituminous emulsion sufficient to inhibit initial slippage and to increase tack and adhesion of the felt layers.

DESCRIPTION OF THE PREFERRED EMBODIMENTS

Roof coatings are provided which have a reduced tendency to slide by adhering a plurality of layers of asphalt-precoated felt by use of a bituminous emulsion containing from 10 to 30 percent by weight based on the total weight of the composition) of a latex compatible with the bituminous emulsion.

The bituminous emulsion as modified by the addition of the latex (hereafter referred to as "a modified bituminous emulsion") is applied to the felts to be adhered at a rate of from 0.2 to 1.0 gallon per 100 square feet of surface. "Per 100 square feet of surface" refers to the surface of one sheet only.

When two sheets of 100 square feet each are to be adhered to each other, the total gallonage of the modified bituminous emulsion utilized would be from 0.2 to 1.0 gallon. That is, the modified bituminous emulsion can all be applied to one sheet or used to coat both sheets. For example if 0.2 gallon were being used "per 100 square feet of surface", 0.1 gallon could be applied to each of the two sheets being bonded together.

A preferred range on the rate of application is from 0.3 to 0.6 gallon per 100 square feet of surface. A particularly preferred rate of application is 0.4 gallon per 100 square feet. A particularly preferred embodiment is a 60 percent residue bituminous emulsion combined with 20 percent by weight of a latex having from 40 to 60 percent by weight dispersed elastomer, the said emulsion being applied at a rate of 0.4 gallon per 100 square feet.

Felts

The precoated felts which are employed in the invention as previously mentioned can be a typical organic felt made of assorted scrap material such as rags, paper, and other organic matter, or it may be a glass felt, which is made of loosely woven glass fibers. The precoated organic felt materials are illustrated by "Dual 80 Ply Sheet" manufactured by Certain-Teed Products Corporation. The Dual 80 Ply Sheet is a heavy felt structure saturated with asphalt and coated on one side with a fine mineral filler to reduce tack and adhesion of the sheet to itself when rolled up. The precoated glass materials are illustrated by Fiberglas Permacap or the Fiberglas Smooth Surface Roll Roofing, manufactured by the Owens-Corning Fiberglas Corporation.

The bitumens which are used to impregnate the felt fibers are typical roll roofing saturants and are comparatively lowmelting, slightly blown or straight-run products. The specifications for the various roofing grade asphalts are set forth in "Specifications for Roofing Asphalts," D-312-44 (1944 Standards), American Society for Testing Materials, page 651, and D-49-49 (Standards), page 939. The materials have an ASTM Ring and Ball softening point of 105° to 155° F. Other materials of higher melting point are sometimes employed and are described as shingle saturants. These materials have softening points of 145° to 165° F.

The precoated felts are prepared by saturating with the felt saturant and, after cooling of the saturant asphalt, coating both sides with layers of coating asphalt. The precoating asphalts are similar to the asphalts conventionally used for mopping or cementing asphalts, but usually have somewhat higher softening points (e.g., 210° to 220° F.) and are generally filled with mineral fillers, such as limestone, dust, or slate flour, from 20 to 40, typically about 30, percent by weight. The layers are generally applied in unequal amounts. Thus, the layer which is to be on the bottom in the laminate usually contains about double the amount of that on the top surface.

Emulsions

The bituminous emulsions suitable for use in the subject invention are typical anionic or cationic emulsions having a residuum ranging from 40 to 70 percent by weight, preferably from 50 to 65 percent. They can be either cationic or anionic in nature. Typical of the emulsifiers which can be used are those disclosed in U.S. Pat. No. 3,445,258 including, among others, the ethylene oxide adducts of fatty amines and various quaternary ammonium salts.

The invention is illustrated in the present specification by examples which involve preparation and testing of emulsions of asphalt. Emulsions of other bituminous materials, for instance, those of coal tar, pitch, and the like may also be similarly formulated for use in this invention. It may be noted that penetration of the bitumen (asphalt) is not critical, and any bitumen capable of being emulsified may be used in accordance with the invention.

A bituminous emulsion used in this invention must meet two criteria. First, it must be compatible with the latex to be blended with it. Secondly, it should not break too fast entrapping water in the coalescing asphalt particles since the diffusion of water out of the system is impeded when the bitumen-in-water emulsion inverts too soon.

In view of this second criterion, the bituminous emulsions may include minor amounts of stabilizing agents such as nonionic emulsifiers to aid in preventing too fast a breakdown of the emulsion and to aid wetting of the ply sheets. Among the stabilizers which may be used are Igepal CO-997, an ethoxylated nonyl phenol having 100 ethyleneoxy units (product of GAF Corp.), and being 70 percent active. Other nonionic stabilizers such as condensation products of ethylene oxide and (1) fatty alcohols, (2) fatty amines and (3) fatty amides may also be used. When present, the stabilizers will constitute no more than 5 percent by weight of the total modified emulsion and will generally be in the range of from 0.2 to 2.0 percent by weight.

Latices

The latices which may be used in this invention have elastomeric solids contents ranging from 20–70 percent by weight, preferably from 30 to 55 percent. They must be compatible with the bituminous emulsions with which they are blended, i.e., an anionic latex should be blended only with anionic bituminous emulsions. Similarly, cationic latices should only be blended with cationic emulsions. Nonionic latices can be used in either type of emulsion.

Among the latices which can be utilized are the ordinary styrene-butadiene rubber latices such as GR-S, Type I latex which contains 75/25 butadiene/styrene copolymer stabilized with 1.5–2.0 percent N-phenyl-2-naphthylamine antioxidant and containing from 28–30 percent total solids.

Also useful are the Pliopave latices (products of the Goodyear Co). Among these are Pliopave L-165K, a cationic latex of a copolymer of styrene and butadiene having a solids content of 40 to 60 percent by weight.

Pliopave L-170, an anionic latex of a copolymer of styrene and butadiene having a solids content of 40 to 60 percent by weight is also useful.

The latex can be any natural or synthetic rubber latex or latex combination. A preferred group of latices are those derived from conjugated dienes, such as those derived from butadiene-styrene, isoprene, and butadiene-acrylonitrile.

Also, latices prepared from ethylene-vinyl ester copolymers may be used. The esters are derived from monocarboxylic fatty acids of 1 to 6 carbon atoms. Thus, esters of formic, acetic, propionic, butanoic, pentanoic, and hexanoic acids are suitably employed. The copolymers will generally have a molecular weight on the order of 100,000 or greater.

These emulsions or latices will generally have a solids content of from 20 to 80 percent, preferably from 40 to 60 percent by weight. The emulsions may contain either a nonionic or ionic emulsifier as colloid-stabilizing agents such as polyvinyl alcohol, partially acetylated polyvinyl alcohol, casein, etc.

The ethylene-vinyl acetate emulsion copolymers are described in the article by M. K. Lindemann, "Vinyl Acetate-Ethylene Emulsion Copolymers," Paint Manufacture (Sept., 1968). Examples of the materials are disclosed in British Pat. No. 1,068,976, published May 17, 1967. The materials are produced by copolymerization of vinyl acetate and ethylene in an aqueous medium under pressures not exceeding 100 atmospheres in the presence of a free-radical-forming catalyst and a nonionic emulsifying agent, the aqueous system being maintained by a suitable buffering agent at a pH of 2 to 6.

The ratio of ethylene to vinyl acetate in the vinyl copolymer is influenced by the pressure, agitation, and viscosity of the polymerization medium. Thus, increasing ethylene content will occur with higher pressures, greater agitation of the mixture, and low viscosity of the polymerization mixture.

A specific example of an ethylene-vinyl ester latex is Aircoflex 510 (product of Air Reduction Company). Aircoflex 510 is an ethylene-vinyl acetate copolymer aqueous latex containing 55 percent by weight solids. The copolymer contains 19 parts of vinyl acetate per 100 parts of ethylene.

The latices may be added to the bituminous emulsions to form the modified bituminous emulsions by simple blending of the latices into the emulsions with stirring.

Method of Construction

The modified emulsions of this invention can be applied to the felts by conventional methods of emulsion application. A spray gun can be used or the modified emulsion may be applied by use of ordinary rollers of the type used to apply paint. The modified emulsion can be applied to either of the sheets or to both of the sheets. Normally, when a sheet such as Dual 80-Ply Sheet is used (which has one side sanded) the sanded side of one sheet is adhered to the unsanded side of the next sheet. This is not, however, required. Two sanded sides may be adhered to each other.

The quantity of emulsion applied must be carefully controlled within the limits specified. If too much is used, run-off and slow cure results. If too little is used, the adhesive strength will be too low.

Formed Structure

The resultant structure of the process of this invention is a built-up roof comprised of a plurality (2 or more) of layers of asphalt-precoated felt bound together by the nonvolatile residuum of the modified bituminous emulsion.

By nonvolatile portion is meant the bitumen and elastomer which remain as adhesive agents after the water and any other volatile material have evaporated at the temperatures encountered on roofs. Minor amounts of stabilizer and emulsifier may also be present.

The thickness of the applied coating will be between about 0.002 and about 0.01 inch and preferably from about 0.003 to about 0.006 inch. The thickness for a given rate of application will of course vary depending on (1) the percent residuum in the modified bituminous emulsion and (2) the density of the residuum.

The ratio of latex solids to bitumen in the resultant structure must be in the range of from 1:2.0–30, preferably in the range of from 1:4.0–10. A particularly preferred composition has a ratio of 1 part latex solids to about 6 parts bitumen.

The following examples are offered by way of illustration and not by way of limitation. All parts and percent are by weight unless otherwise indicated.

EXAMPLE 1

An experimental roof (1) was constructed by first nailing a fifteen-pound saturated felt (A) to a one-half inch plywood deck.

Then, using an ordinary paint roller, an emulsion having the composition set forth in Table I below was applied to the unsanded side of a Dual 80 felt at a rate of 0.18-0.20 gallon per 100 square feet. After a few minutes drying (until all the emulsion turned black), the sheet (B) was turned over, placed on the underlying felt (A) and rolled to insure complete contact between sheets (A) and (B).

TABLE I

| | |
|---|---|
| 60% | by weight of an asphalt having a penetration of 100/200 |
| 2% | by weight Vinsol resin |
| 0.23% | by weight sodium hydroxide |
| | Balance to make 100%: water |

In a similar manner, a second sheet of Dual 80 felt (C) was coated on the unsanded side with the emulsion of Table I at a rate of from 0.16 to 0.24 gallon per 100 square feet, allowed to dry as above, and rolled to insure complete contact between (B) and (C).

The composite structure comprised of the plywood deck, and felts (A), (B) and (C) was then coated with a clay emulsion and coated with gravel.

The peel strengths of the adhering felts were then tested after several days' cure with the results shown in Table II.

EXAMPLES 2–4

In a similar manner other roof structures were constructed and tested with the results shown in Table II.

TABLE II

| | PROPERTIES OF EXPERIMENTAL ROOFS | | | | | | | |
|---|---|---|---|---|---|---|---|---|
| | Between A and B Plies | | | | Between B and C Plies | | | |
| | Application Rate Gal./100 Ft[2] | | Peel Strength g/In. | | Application Rate Gal./100 Ft[2] | | Peel Strength g/In. | |
| Adhesive | Sanded Side/A | Unsanded Side/B | Peel Rate 2 cm/Min. | Peel Rate 10 cm/Min. | Sanded Side/A | Unsanded Side/B | Peel Rate 2 cm/Min. | Peel Rate 10 cm/Min. |
| SS-1 Emulsion[5] | | 0.18-0.20 | Too Low[2] | Too Low[2] | | 0.16-0.24 | Too Low[2] | Too Low[2] |
| SS-1 Emulsion | 0.37 | 0.17-0.20 | | 850[1] | 0.15 | 0.16-0.24 | | 85[1] |
| DM-1h[6] + 1% by weight Igepal 997 (based on the DM-1h emulsion) | | 0.20 | | 50[1] | | 0.19-0.24 | | 55[1] |
| 80% by volume DM-1h + | | 0.35-0.44 | 225-900[3] | 800-900[3] | | 0.33-0.34 | 500-900[3,4] | 800-1800[3,4] |

TABLE II-continued

PROPERTIES OF EXPERIMENTAL ROOFS

| | Between A and B Plies | | | | Between B and C Plies | | | |
|---|---|---|---|---|---|---|---|---|
| | Application Rate Gal./100 Ft² | | Peel Strength g/In. | | Application Rate Gal./100 Ft² | | Peel Strength g/In. | |
| Adhesive | Sanded Side/A | Unsanded Side/B | Peel Rate 2 cm/Min. | Peel Rate 10 cm/Min. | Sanded Side/A | Unsanded Side/B | Peel Rate 2 cm/Min. | Peel Rate 10 cm/Min. |
| 1% by weight Igepal 997 (based on total emulsion) + 20% by volume Pliopave L-170 | | 0.35–0.44 | 804–1100[1,4] | 965–2680[1,4] | | 0.33–0.34 | 1010–1050[1,4] | 3115–3170[1,4] |

Notes
A  15 lb. Asphalt Saturated Felt
B  First Ply of Dual-80 Ply Sheet
C  Second Ply of Dual-80 Ply Sheet
[1]Seven Days' Curing Time
[2]Too Weak to Mount and Test
[3]Four Days' Curing Time
[4]Felt Failure
[5]60% by weight of a 100/200 penetration asphalt, 2% by weight of Vinsol resin (a pinewood resin, product by Hercules, Inc.) emulsifier, 0.23% by weight sodium hydroxide, the balance being water.
[6]60% by weight of a 56/60 penetration asphalt, 2% by weight of Vinsol resin (a pinewood resin, a product of Hercules, Inc.) emulsifier, 0.23% by weight sodium hydroxide, the balance being water.

It is apparent that many widely different embodiments of this invention may be made without departing from the scope and spirit thereof; and, therefore, it is not intended to be limited except as indicated in the appended claims.

I claim:

1. In a built-up roof using at least two layers of asphalt-precoated felts in layers, the improvement comprised of said layers bound together by at least one binding layer of the residuum of an aqueous latex modified bituminous emulsion, in which (1) the weight ratio of the latex solids to bitumen is in the range of from 1:2.0–30 and (2) said binding layer has a thickness of from about 0.002 to about 0.01 inch.

2. Claim 1 wherein said ratio is in the range of 1:4.0–10.

3. Claim 2 wherein said binding layer has a thickness of from about 0.003 to about 0.006 inch.

4. Claim 3 wherein said ratio of the said latex solids to said bitumen is 1 to 6.

5. Claim 1 wherein said binding layer has a thickness of from about 0.003 to about 0.006 inch.

6. In a process for preparing built-up roofing employing at least two asphalt-precoated felts the improvement comprised of:

I. applying to the surfaces of said felts a modified bituminous emulsion at a rate of from 0.2 to 1.0 gallon per 100 square feet of surface, said modified bituminous emulsion comprised of (1) from 70 to 90 parts by weight of a bituminous emulsion having a residuum of from 40 to 70 percent by weight and (2) from 30 to 10 parts by weight of a latex having a solids content of from 20 to 70 percent by weight with the proviso that said modified bituminous emulsion has 100 total parts by weight, and II. contacting said felt sheets to bind said felts together.

7. Claim 6 wherein said rate of application is from 0.3 to 0.6 gallon per 100 square feet of surface.

8. Claim 6 wherein said emulsion has a residuum of from 50 to 65 percent by weight.

9. Claim 8 wherein said latex has an elastomeric solids content of from 30 to 55 percent by weight.

10. Claim 9 wherein the bitumen in said bituminous emulsion is asphalt.

11. Claim 10 wherein said rate is from 0.3 to 0.6 gallon per 100 square feet of surface.

12. Claim 11 wherein the elastomer in said latex is a copolymer of styrene and butadiene.

13. Claim 11 wherein said bituminous emulsion is cationic in nature.

14. Claim 11 wherein said bituminous emulsion is anionic in nature.

* * * * *